(12) United States Patent
Sarraf et al.

(10) Patent No.: US 8,970,317 B2
(45) Date of Patent: Mar. 3, 2015

(54) CONTACTLESS CONNECTOR

(75) Inventors: David Bruce Sarraf, Elizabethtown, PA (US); Charles David Fry, New Bloomfield, PA (US); Sean Patrick McCarthy, Palmyra, PA (US); Bruce Foster Bishop, Aptos, CA (US)

(73) Assignee: Tyco Electronics Corporation, Berwyn, PA (US)

( * ) Notice: Subject to any disclaimer, the term of this patent is extended or adjusted under 35 U.S.C. 154(b) by 242 days.

(21) Appl. No.: 13/336,705

(22) Filed: Dec. 23, 2011

(65) Prior Publication Data

US 2013/0163483 A1 Jun. 27, 2013

(51) Int. Cl.
*H01P 5/02* (2006.01)
*H04B 5/00* (2006.01)

(52) U.S. Cl.
USPC .................. 333/24 R; 333/135; 455/41.1

(58) Field of Classification Search
CPC .......... H01P 5/02; H01P 5/022; H01P 5/024; H04B 5/00
USPC ............. 333/24 R; 340/10.1, 572.1; 370/279, 370/293; 375/377; 455/7, 272, 41.1
See application file for complete search history.

(56) References Cited

U.S. PATENT DOCUMENTS

| | | | |
|---|---|---|---|
| 6,320,509 B1 | 11/2001 | Brady | |
| 7,321,277 B2 * | 1/2008 | Broad et al. | 333/110 |
| 7,890,053 B2 * | 2/2011 | Washiro | 455/41.1 |
| 7,893,889 B2 * | 2/2011 | Proctor et al. | 343/893 |
| 2003/0161419 A1 | 8/2003 | Bach | |
| 2007/0229270 A1 | 10/2007 | Rofougaran | |

FOREIGN PATENT DOCUMENTS

| | | |
|---|---|---|
| WO | 2008111914 A1 | 9/2008 |
| WO | 2009065806 A1 | 5/2009 |

OTHER PUBLICATIONS

PCT International Search Report issued in related PCT Application No. PCT/US2012/068112 on Apr. 24, 2013.

* cited by examiner

*Primary Examiner* — Dean Takaoka (57) ABSTRACT

A contactless connector includes a transmitter having a first transmit integrated circuit generating a first signal and a second transmit integrated circuit generating a second signal. A first pick-up antenna is adjacent the first transmit integrated circuit and conveys the first signal along a first transmission line to a first propagation antenna. A second pick-up antenna is adjacent the second transmit integrated circuit and conveys the second signal along a second transmission line to a second propagation antenna. The first and second propagation antennas transmit the first and second signals to a propagation path at different and separable polarizations to allow duplex communication with the propagation path.

23 Claims, 4 Drawing Sheets

CONTACTLESS CONNECTOR

BACKGROUND OF THE INVENTION

The subject matter herein relates generally to contactless connectors that provide contactless data transmission at short range using RF energy.

Contactless connectors typically include a transmitter chip and a receiver chip. A data stream is furnished to the transmitter chip, which produces a modulated RF signal, such as at 60 GHz. That signal is propagated a short distance to the receiver chip, which demodulates the signal and recovers the original data stream. The chips are typically integrated into connector housings to allow transmission of data between the connector pairs without the need for an electrical or optical connection. Multiple channels can be provided by using multiple transmitter chip and receiver chip pairs. To avoid crosstalk between channels, each chip pair is isolated from a neighboring pair by distance or by shielding.

Certain applications require relative motion between the connector components. The chips can be separated longitudinally within certain limits with little or no degradation in performance. Separation allows reduced precision in the mated position of the connector carriers or even some compliance to allow for mismatch in the position of the connector carriers. Problems arise when complex translation is required. For example, translation in more than one direction is problematic and leads to signal degradation and/or transmission failure. Additionally, translation of connector components that have more than one communication channel is problematic. Co-location of the chips on or near an axis of rotation would result in co-interference or mixing of the data streams within the multiple channels.

An additional complication is integration of antennas within the chips. For example, when the antennas produce a linearly-polarized wave front, rotation of the chip would change the relative angle between the transmitter chip and receiver chip. The signal strength could fall to near zero when the two antennas were orthogonal.

A need remains for a contactless connector that allows installation of an antenna structure that facilitates rotary motion. A need remains for a contactless connector that provides inter-channel isolation.

BRIEF DESCRIPTION OF THE INVENTION

In one embodiment, a contactless connector is provided including a transmitter having a first transmit integrated circuit generating a first signal and a second transmit integrated circuit generating a second signal. A first pick-up antenna is adjacent the first transmit integrated circuit and conveys the first signal along a first transmission line to a first propagation antenna. A second pick-up antenna is adjacent the second transmit integrated circuit and conveys the second signal along a second transmission line to a second propagation antenna. The first and second propagation antennas transmit the first and second signals to a propagation path at different and separable polarizations to allow duplex communication with the propagation path.

Optionally, the first and second signals may be propagated as axisymmetric modes. The first signal may be right hand circularly polarized and the second signal may be left hand circularly polarized. The contactless connector may include an antenna element having a ground plane, the first propagation antenna and the second propagation antenna. The antenna element may have a dielectric substrate supporting and extending between the first propagation antenna and the second propagation antenna with at least one of the first and second transmission lines extending through the dielectric substrate. A shield may separating the first transmit integrated circuit and the second transmit integrated circuit.

In another embodiment, a contactless connector is provided having a transmitter including a transmit integrated circuit generating a signal, a pick-up antenna adjacent the transmit integrated circuit and conveying the signal along a transmission line to a propagation antenna that re-transmits the signal. A propagation path receives the signal emitted from the propagation antenna and conveys the signal from a first end to a second end of the propagation path. The contactless connector also includes a receiver having a receiving antenna receiving the signal from the propagation path, a transmission line coupled to the receive antenna and conveying the signal to a re-transmit antenna and a receive integrated circuit receiving the signal from the re-transmit antenna. Optionally, the propagation path may allow relative rotation between the propagation antenna and the receiving antenna. The propagation path may be defined, at least in part, by a waveguide having a rotary joint allowing relative rotation between the first and second ends of the propagation path.

In another embodiment, a contactless connector is provided having a first module having a first communication channel communicating first signals and a second communication channel communicating second signals. The signals of the first communication channel are produced by a first polarization mode and the signals of the second communication channel are produced by a second polarization mode distinct and separable from the first polarization mode. The contactless connector has a second module having a first communication channel communicating the first signals with the first module and a second communication channel communicating the second signals with the first module. A propagation path conveying the first and second signals between a first end and a second end of the propagation path between the first and second modules.

In another embodiment, a contactless connector is provided having a transmitter sending RF data transmissions in different propagation modes and a propagation path receiving the RF data transmissions and conveying the RF data transmissions from a first end to a second end of the propagation path. The first end receives the RF data transmissions from the transmitter. A receiver receives the RF data transmissions from the propagation path. The receiver is capable of recovering the RF data transmissions of the different propagation modes.

In one embodiment, a contactless connector is provided include a transmitter, a receiver and a propagation path therebetween. The transmitter includes a first communication channel sending first signals and a second communication channel sending second signals. The signals of the first communication channel being produced by a first polarization mode and the signals of the second communication channel being produced by a second polarization mode distinct and separable from the first polarization mode. The propagation path receives the first and second signals and conveys the first and second signals from a first end to a second end of the propagation path. The propagation path has a rotary joint allowing relative rotation between the first end and the second end. The receiver has a first communication channel receiving the first signals and a second communication channel receiving the second signals.

Optionally, the transmitter may be located within a first housing and the receiver may be located within a second housing with the propagation path being positioned between the first and second housings. The rotary joint may accommodate relative rotation between the first and second housings. The propagation path propagates the first and second signals in the same space and on the same frequency. The first and second signals have separable polarizations and the receiver recovers the first and second signals.

Optionally, the first communication channel of the transmitter may include an antenna emitting the first signal and the second communication channel of the transmitter may include an antenna emitting the second signal. The first communication channel of the receiver may include an antenna excited by the first signal and not the second signal and the second communication channel of the receiver may include an antenna excited by the second signal and not by the first signal.

Optionally, the first polarization mode and the second polarization mode may be axisymmetric. The first polarization mode and the second polarization mode may be orthogonal. The first polarization mode may be right hand circularly polarized and the second polarization mode may be left hand circularly polarized.

Optionally, the first communication channel of the transmitter may include a first transmit integrated circuit generating the first signal and a first pickup antenna adjacent the first transmit integrated circuit and conveying the first signal along a first transmission line to a first propagation antenna. The second communication channel of the transmitter may include a second transmit integrated circuit generating the second signal and a second pickup antenna adjacent the second transmit integrated circuit and conveying the second signal along a second transmission line to a second propagation antenna.

In another embodiment, a contactless connector is provided having a transmitter sending RF data transmissions in different propagation modes and a propagation path receiving the RF data transmissions and conveying the RF data transmissions from a first end to a second end of the propagation path. The first end receives the RF data transmissions from the transmitter. A receiver receives the RF data transmissions from the propagation path. The receiver is capable of recovering the RF data transmissions of the different propagation modes. Optionally, the propagation path may include a rotary joint allowing relative rotation between the first end and the second end.

In a further embodiment, a contactless connector is provided having a propagation path conveying RF transmissions between a first end and a second end of the propagation path. A transmitter is coupled to the propagation path. The transmitter includes a first transmit integrated circuit generating a first signal and a second transmit integrated circuit generating a second signal. The transmitter includes a first pick-up antenna adjacent the first transmit integrated circuit and conveying the first signal along a first transmission line to a first propagation antenna. The transmitter includes a second pick-up antenna adjacent the second transmit integrated circuit and conveying the second signal along a second transmission line to a second propagation antenna. The first and second propagation antennas transmit the first and second signals to the propagation path at different and separable polarizations to allow duplex communication with the propagation path.

Optionally, the propagation path may include a rotary joint allowing relative rotation between the first end and the second end. The first and second signals may be propagated as axisymmetric modes. The first signal may be right hand circularly polarized and the second signal may be left hand circularly polarized. Optionally, the first and second transmission lines may be coaxial cables or may be plated vias.

Optionally, the contactless connector may include an antenna element having a ground plane, the first propagation antenna and the second propagation antenna. The contactless connector may include an antenna element having a dielectric substrate supporting and extending between the first propagation antenna and the second propagation antenna where at least one of the first and second transmission lines extend through the dielectric substrate. A shield may separate the first transmit integrated circuit and the second transmit integrated circuit.

Optionally, the contactless connector may include an antenna element having dual orthogonal feed points and a 90 degree hybrid coupler. The contactless connector may include a sinuous antenna element defining the first and second propagation antennas.

DETAILED DESCRIPTION OF THE INVENTION

Embodiments described herein provide a contactless connector having two modules that form a data link. The modules may include a pickup antenna, a transmission line and a re-radiating antenna. The pickup antenna may accept a linearly polarized signal from an RF-based transmitter chip and convey such signal to the transmission line. The transmission line feeds the signal to the re-radiating antenna which sends the signal out from the first module to the second module. The structures in the second module perform a reciprocal function and emit a linearly polarized signal which is coupled to an RF-based receiver chip. Between the modules, the signal (e.g. EM wave) is axisymmetric, using mode families such as circular polarization, TE01/TE10, and the like.

Embodiments described herein may include modules having only a single transmission line. For example, the first module could contain a single transmit-only chip and the second module could contain a single receive-only chip to form a unidirectional single-channel communication channel. In other embodiments, both modules could contain a single transmit-receive chip, with each chip set to a fixed function (e.g. transmit or receive) to form a unidirectional single-channel communication channel. The direction of the communication channel could be set at will by reversing the function of each of the two chips. In other embodiments, both modules could contain a single transmit-receive chip.

Embodiments described herein may include modules having multiple transmission lines. For example, the system can consist of modules having two RF-based chip sets. Each transmit chip could be fitted with a pickup antenna and a transmission line. The transmission lines could bring the signal to a re-radiating antenna. The re-radiating antenna could be capable of producing two different signals having orthogonal or separable polarizations. Both signals could be propagated down a transmission path toward the second module. The signals selectively excite the respective antenna in the second module, which could convey the corresponding signal through a corresponding transmission line to the corresponding pickup antenna, and then to a corresponding RF-based receive chip. Embodiments may provide the first module with two transmit chips and the second module with two receive chips for a two-channel, single-direction system. Other embodiments may provide one transmit chip and one receive chip in each module to form a two-channel bidirectional system (e.g. full duplex communication). One possible mode pair includes right hand circularly polarized (RHCP) and left hand circularly polarized (LHCP) modes. Embodiments may include a stacked patch antenna, a hybrid coupler and sinuous antenna, a hybrid coupler and fat crossed dipole antenna, or other antenna structure. Another possible mode pair includes right hand elliptically polarized and left hand elliptically polarized modes. Another possible mode pair includes TM01 and TE01 or other orthogonal modes that can exist in the same space and at the same time, and which are separable from one another.

Embodiments described herein may include a rotary joint in the RF transmission path between the two re-radiating antennas. The use of axisymmetric EM modes in that portion of the path makes the signal strength independent of the relative angle of rotation between the first module and the second module. Embodiments described herein may include a waveguide that forms a portion of the transmission path between the re-radiating antennas. The waveguide can be made of a length of hollow metallic tubing. Other types of waveguides may be used in other embodiments, such as a waveguide made of a solid dielectric material such as plastic or ceramic that may also include a metallic coating on its outer surface. The waveguide may have one or more gaps or breaks, and the gap(s) may be made of a material that differs from the waveguide material. For example, a plastic waveguide may have a gap which contains air, water, flesh, vacuum, or glass or other non-metal. The break or gap may not deliberately incorporate an additional material. The two faces of the waveguide may be butted together with additional material (such as air) interstitially and incidentally in the gap. The break or gap may allow rotary motion. The break or gap may allow linear separation. The waveguide may increase the allowable separation distance between the RF-based chips by reducing the divergence of the RF signal emitted by the first chip and maintaining an acceptable level of signal strength at the receiving chip. The waveguide may reject sources of external noise and improve the signal-to-noise ratio of the system for a given separation distance.

Figure 1:
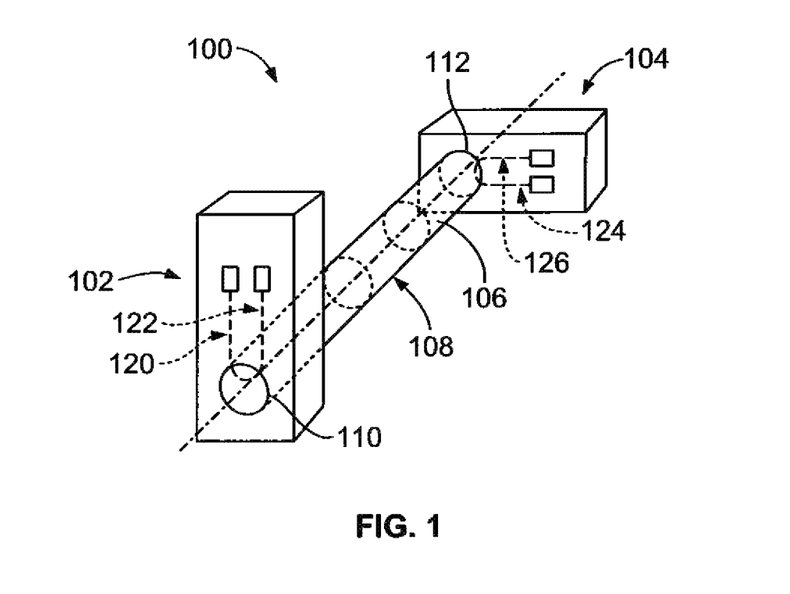
FIG. 1 illustrates a contactless connector formed in accordance with an exemplary embodiment showing a transmitter and receiver with a propagation path therebetween.
Figure 2:
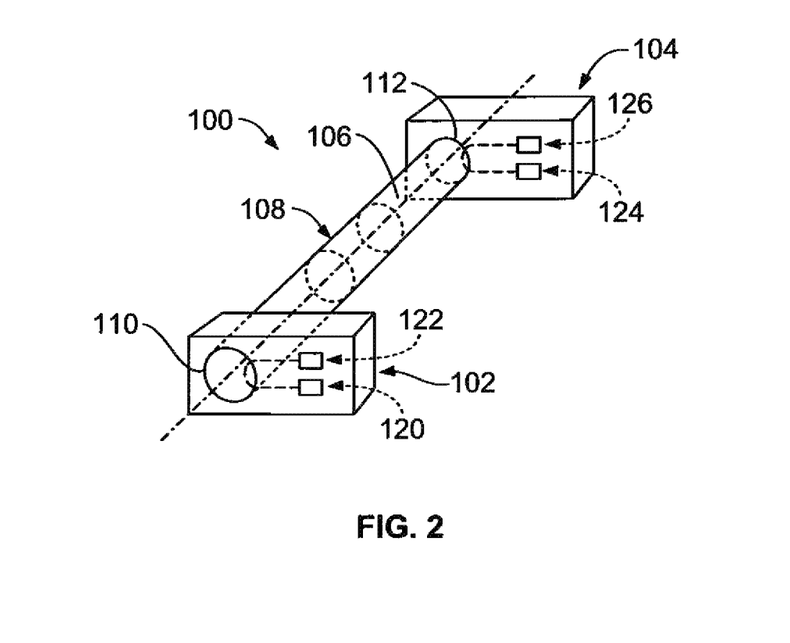
FIG. 2 illustrates the contactless connector with the transmitter and receiver in different relative positions than illustrated in FIG. 1.

FIGS. 1 and 2 illustrate a contactless connector 100 formed in accordance with an exemplary embodiment. The connector 100 includes a first module 102 and a second module 104 that provides contactless data transmission at short range using RF energy. A propagation path 106 is defined between the first and second modules 102, 104 and provides a defined transmission path for the RF energy between the first and second modules 102, 104. In an exemplary embodiment, the propagation path 106 may be a waveguide, however the contactless connector 100 is not limited to use of a waveguide. The waveguide may be a hollow metal tube, such as a copper tube. The waveguide may be a plastic, ceramic, glass or other body. The waveguide may extend along only part of the path between the first and second modules 102, 104. The propagation path 106 may be any type of propagation path, including an air gap between the first and second modules 102, 104. A vacuum may be provided along at least a portion of the propagation path 106. The propagation path 106 may be non-continuous and may span across different interfaces and/or materials.

In the illustrated embodiment, the propagation path 106 is defined by a waveguide, and the propagation path 106 may be referred to hereinafter as the waveguide 106. The waveguide 106 has a joint 108 that allows translation of the first and second modules 102, 104 relative to one another. In an exemplary embodiment, the joint 108 allows rotary motion allowing relative rotation the first module 102 at a first end 110 of the waveguide 106 and the second module 104 at a second end 112 of the wave guide 106. The joint 108 may provide linear translation in addition to, or in alternative to, the rotary translation. In embodiments that do not use the waveguide, the first and second modules 102, 104 may be coupled along the propagation path in a rotary fashion that allows relative movement between the first and second modules 102, 104 while conveying the signals between the first and second modules 102, 104.

In an exemplary embodiment, the first module 102 defines a transmitter and the second module 104 defines a receiver for receiving the RF energy emitted by the transmitter. The first module 102 may be referred to hereinafter as a transmitter 102. The second module 104 may be referred to hereinafter as a receiver 104. In an alternative embodiment, the first module 102 defines a receiver and the second module 104 defines a transmitter. Optionally, the first module 102 may define both a transmitter and a receiver and the second module 104 may define both a transmitter and a receiver. The first and second modules 102, 104 may allow single directional communication or may allow bi-directional communication.

In an exemplary embodiment, the connector 100 allows duplex communication between the transmitter 102 and the receiver 104. Multiple transmit and receive pairs produce multiple communication channels through the waveguide 106 between the transmitter 102 and the receiver 104. Each channel uses a distinct and separable polarization mode to provide isolation between the RF signals of the various communication channels.

In an exemplary embodiment, the transmitter 102 includes a first communication channel 120 that emits first signals and a second communication channel 122 that emits second signals. The receiver 104 includes a first communication channel 124 that receives the first signals and a second communication channel 126 that receives the second signals. The first signals are produced by a first polarization mode and the second signals are produced by a second polarization mode distinct and separable from the first polarization mode.

The first and second signals are emitted from the transmitter 102 into the waveguide 106 as RF energy. The waveguide 106 conveys the first and second signals to the receiver 104. The transmitter 102 sends the first signals as RF data transmissions and the waveguide 106 conveys the RF data transmissions to the receiver 104. The receiver 104 receives the RF data transmissions from the waveguide 106 and recovers the RF data transmissions. In an exemplary embodiment, the RF data transmissions have different propagation modes allowing the first and second signals to be conveyed through the waveguide 106 in the same space and on the same frequency but with separable polarizations allowing the receiver 104 to separate out the first signal from the second signal.

FIGS. 1 and 2 illustrate the transmitter 102 at different angular orientations with respect to the receiver 104. For example, FIG. 1 illustrates the transmitter 102 rotated at approximately 90 degrees with respect to the angular orientation shown in FIG. 2. In an exemplary embodiment, both the transmitter 102 and the receiver 104 are capable of rotating along an angular path. For example, the transmitter 102 can rotate at least 360 degrees in either direction and the receiver 104 can rotate at least 360 degrees in either direction.

Figure 3:
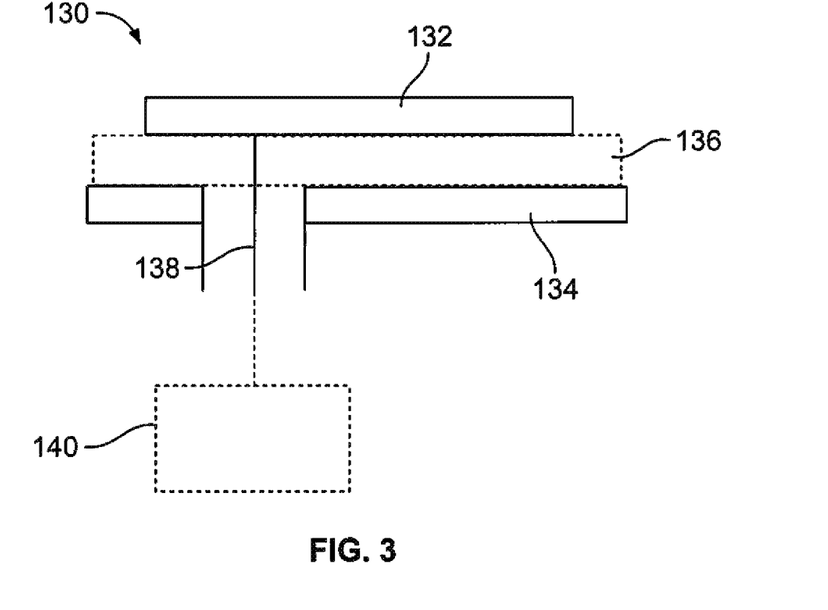
FIG. 3 illustrates an antenna element for use by either the transmitter or the receiver and formed in accordance with an exemplary embodiment.

FIG. 3 illustrates an antenna element 130 for use by either the transmitter 102 or the receiver 104 (both shown in FIGS. 1 and 2). The antenna element 102 includes an antenna structure 132 separated from a ground plane 134 by a dielectric structure 136. The antenna structure 132 is a conductive body. The antenna structure 132 may have any shape depending on the particular application. Optionally, the antenna structure 132 may be planar. The antenna structure 132 may be rectangular in shape. The ground plane 134 is also a conductive structure. The ground plane 134 may be planar. The ground plane 134 may be larger than the antenna structure 132. The dielectric structure 136 may be a dielectric body, such as a ceramic substrate, or may be air.

RF energy is fed to the antenna structure 132 by a transmission line 138 communicatively coupled to a drive component, such as an integrated circuit component 140. The integrated circuit component 140 has an RF output transmitted by the transmission line 138 to the antenna structure 132. The transmission line 138 may be a coaxial cable. Alternatively, the transmission line 138 may be another structure configured to transmit the RF energy, such as a conductive via. Optionally, the transmission line 138 may be connected to the antenna structure 132 at a feed point that is non-centrally located, but rather is positioned closer to an edge of the antenna structure 132.

The antenna structure 132, ground plane 134 and dielectric structure 136 form a capacitor which emits an electric field from the edges of the antenna structure 132. The electric field grows and combines into a traveling electromagnetic (EM) wave which propagates away from the antenna structure 132. Through suitable selection of the antenna structure 132 shape and feed point, the antenna element 130 can readily produce linearly polarized EM waves or circularly polarized EM waves. The antenna element 130 may produce right hand circularly polarized EM waves or left hand circularly polarized EM waves.

Figure 4:
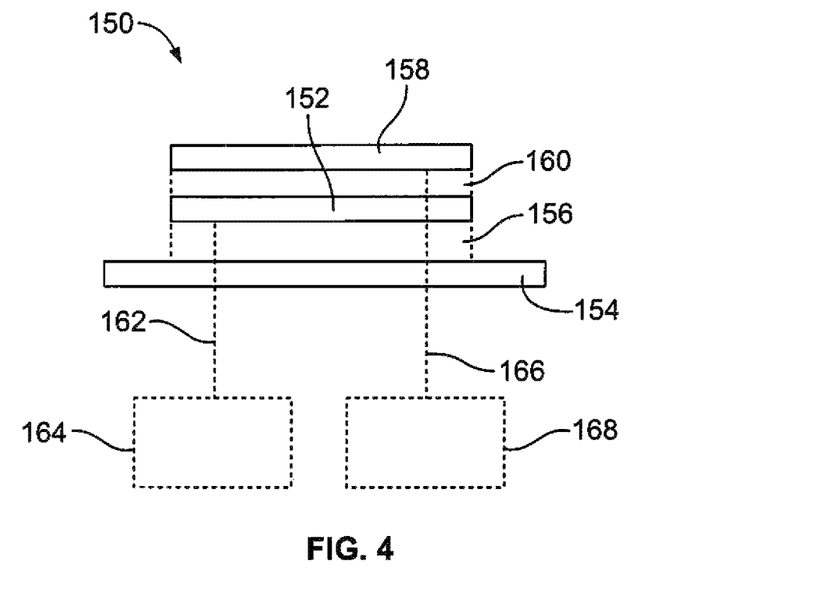
FIG. 4 illustrates an antenna element for use with either the transmitter or the receiver and formed in accordance with an exemplary embodiment.

FIG. 4 illustrates an antenna element 150 for use with either the transmitter 102 or the receiver 104 (both shown in FIGS. 1 and 2) and formed in accordance with an exemplary embodiment. The antenna element 150 includes a first antenna structure 152 suspended over a ground plane 154 with a first dielectric structure 156 there between. A second antenna structure 158 is also suspended over the ground plane 154 and the first antenna structure 152 with a second dielectric structure 160 between the second antenna structure 158 and the first antenna structure 152. The first and second antenna structures 152, 158 are arranged in a stacked configuration with the dielectric structures 156, 160. The first and second antenna structures 152, 158 are coaxial. Other configurations may be used to convey multiple signals, such as a multi-antenna array that are not stacked.

A first transmission line 162 is connected to the first antenna structure 152 and feeds RF energy to the first antenna structure 152 from a first integrated circuit component 164. The second antenna structure 158 is fed RF energy from a second transmission line 166 which is communicatively coupled to a second integrated circuit component 168. Each antenna structure 152, 158 is separately fed RF energy from the integrated circuit components 164, 168, respectively.

The antenna structures 152, 158 emit separate EM waves corresponding to the signals from the corresponding integrated circuit components 164, 168. Since the RF energy begins propagation at the edges of the antenna structures 152, 158, the second antenna structure 158 in the stack does not obstruct the signal emitted from the first antenna structure 152. In an exemplary embodiment, the first and second antenna structures 152, 158 emits signals that have different and separable polarizations such that the signals may be propagated in the same space and/or on the same frequency through the waveguide 106 (shown in FIGS. 1 and 2), but which are separable by the receiver 104. Through suitable selection of the size, shape and feed point of the antenna structures 152, 158, the antenna element 150 can readily produce differently polarized EM waves, such as radially polarized EM waves, right hand circularly polarized waves or left hand circularly polarized waves.

Figure 5:
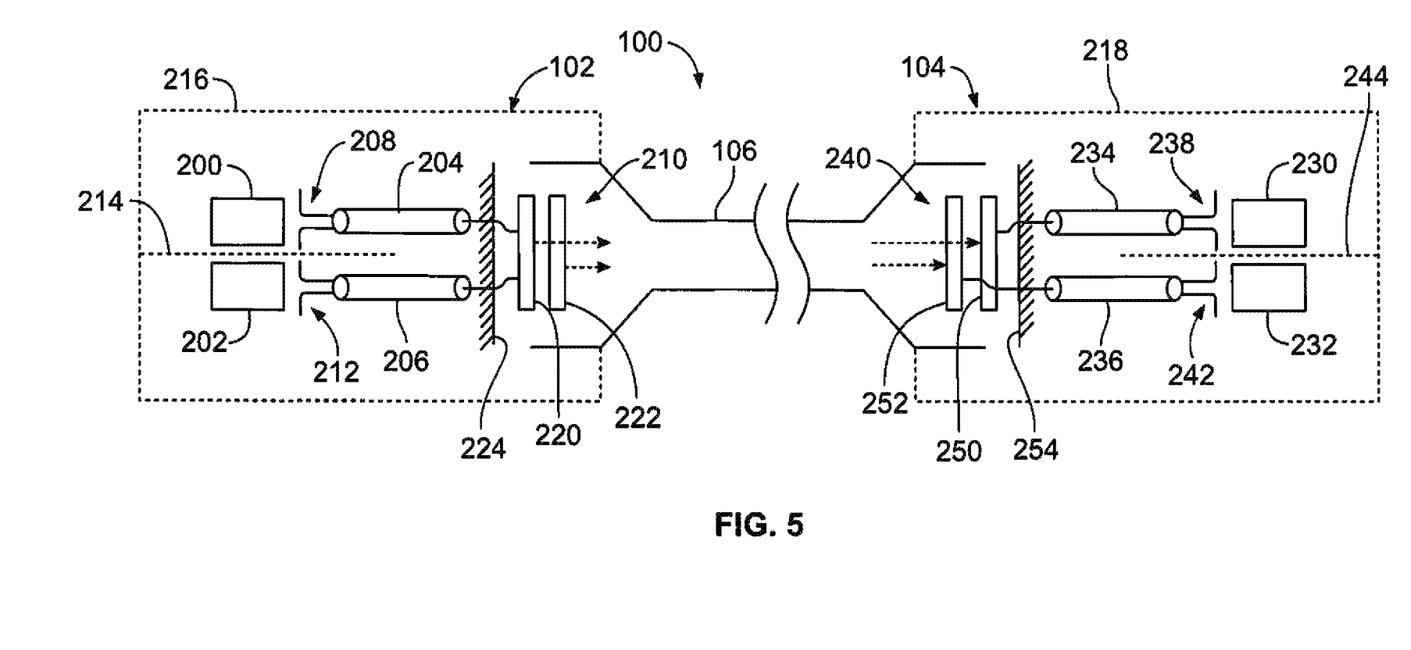
FIG. 5 illustrates the connector showing the wave guide between the transmitter and the receiver.

FIG. 5 illustrates the connector 100 showing the wave guide 106 between the transmitter 102 and the receiver 104. The waveguide 106 conveys the first and second signals of the first and second communication channels 120, 122 of the transmitter 102 to the first and second communication channels 124, 126 of the receiver 104. In an exemplary embodiment, the waveguide 106 conveys the first and second signals as EM waves that propagate away from the transmitter 102 toward the receiver 104. Both EM waves are propagated through the waveguide 106. The first and second communication channels 120, 122 use distinct and separable polarization modes to provide isolation between the signals and the first and second communication channels 124, 126 of the receiver 104 are able to separate out the appropriate signals.

The transmitter 102 includes a first transmit integrated circuit 200 generating a first signal and a second transmit integrated circuit 202 generating a second signal. Data streams are furnished to the first and second transmit integrated circuits 200, 202, which produce corresponding modulated signals, such as at 60 GHz. For example, the first and second transmit integrated circuit 200, 202 may be coupled to a circuit board and receive signals from conductors of the circuit board. A first transmission line 204 is communicatively coupled to the first transmit integrated circuit 200 and a second transmission line 206 is communicatively coupled to the second transmit integrated circuit 202. In an exemplary embodiment, a first pickup antenna 208 is position adjacent the first transmit integrated circuit 200 and is connected to the first transmission line 204. The first pickup antenna 208 receives the energy from the first transmit integrated circuit 200 and the first transmission line 204 conveys the energy to an antenna element 210 of the transmitter 202. In an exemplary embodiment, a second pickup antenna 212 is positioned adjacent the second transmit integrated circuit 202 and is coupled to the second transmission line 206. The second pickup antenna 212 receives the energy from the second transmit integrated circuit 202 and the second transmission line 206 conveys the energy to the antenna element 210.

In an exemplary embodiment, a shield 214 is positioned between the first and second transmit integrated circuits 200, 202 and the first and second pickup antennas 208, 212. Optionally, the first and second transmission lines 204 may be shielded coaxial cables, so the shield 214 does not need to extend along the first and second transmission lines 204, 206.

The transmitter 102 includes a housing 216 holding the various components of the transmitter 102. Optionally, the housing 216 may be connected to the first end 110 of the waveguide 106. The housing 216 may be moveable, such as being rotatable or moveable in a linear direction relative to the receiver 104. The receiver 104 includes a housing 218 holding the various components of the receiver 104. Optionally, the housing 218 may be connected to the second end 112 of the waveguide 106. The housing 218 may be moveable, such as being rotatable or moveable in a linear direction relative to the transmitter 102.

In an exemplary embodiment, the antenna element 210 may be similar to the antenna element 150 (shown in FIG. 4). The antenna element 210 includes a first propagation antenna 220 and a second propagation antenna 222. The antenna element 210 includes a ground plane 224. The first and second propagation antennas 220, 222 are re-radiating antennas that re-radiate the signals from the pickup antennas 208, 212 and transmission lines 204, 206. The first and second propagation antennas 220, 222 are arranged in a stacked configuration with the ground plane 224. The first and second propagation antennas 220, 222 are separated by dielectric, such as air or another dielectric material, such as ceramic. Optionally, the antenna element 210 may be a circuit board with the ground plane 224 and propagation antennas 220, 222 being defined by different layers of the circuit board.

The first transmission line 204 is communicatively coupled to the first propagation antenna 220. The second transmission line 206 is communicatively coupled to the second propagation antenna 222. In an exemplary embodiment, the first and second transmission lines 204, 206 are coaxial cables with the center conductors of such coaxial cables being terminated directly to the first and second propagation antennas 220, 222, such as by soldering the center conductors to the propagation antennas 220, 222.

The size, and shape of the propagation antennas 220, 222 as well as the location of the feed point where the transmission lines 204, 206 are attached to the propagation antennas 220, 222 produce differently polarized EM waves that propagate away from the antennas 220, 222. The EM waves may be radially polarized, circularly polarized, elliptically polarized or have another polarization mode. The EM waves may be orthogonal. The EM waves are separable. In an exemplary embodiment, the EM waves are right hand circularly polarized (RHCP) and left hand circularly polarized (LHCP). Using different polarization modes provides isolation between the first and second signals of the first and second communication channels 120, 122. The first propagation antenna 220 selectively emits EM waves having a particular polarization mode and the second propagation antenna 222 selectively emits EM waves having a different, distinct polarization mode. The receiver 104 includes components that receive the EM waves generated by either the first communication channel 120 or the second communication channel 122, while filtering out other signals.

The receiver 104 includes an antenna element 240 that receives the first and second signals and separates the first and second signals. The receiver 104 includes a first receive integrated circuit 230 receiving the first signal from the antenna element 240 and a second receive integrated circuit 232 receiving the second signal from the antenna element 240. The first and second receive integrated circuits 230, 232 recover the signals. The first and second receive integrated circuit 230, 232 may be coupled to a circuit board and convey the signals to conductors of the circuit board.

A first transmission line 234 is communicatively coupled between the antenna element 240 and the first receive integrated circuit 230. A second transmission line 236 is communicatively coupled between the antenna element 240 and the second receive integrated circuit 232. In an exemplary embodiment, a first antenna 238 is position adjacent the first receive integrated circuit 230 and is connected to the first transmission line 234. The first antenna 238 receives the energy from the first transmission line 234 and propagates the energy to the first receive integrated circuit 230. A second antenna 242 is positioned adjacent the second receive integrated circuit 232 and is connected to the second transmission line 236. The second antenna 242 receives the energy from the second transmission line 236 and propagates the energy to the second receive integrated circuit 232. In an alternative embodiment, the first and second transmission lines 234, 236 may be directly coupled to the first and second receive integrated circuits 230, 232 and convey the signals directly thereto without the use of the antennas 238, 242.

In an exemplary embodiment, a shield 244 is positioned between the first and second receive integrated circuits 230, 232 and the first and second antennas 238, 242. Optionally, the first and second transmission lines 234 may be shielded coaxial cables, so the shield 244 does not need to extend along the first and second transmission lines 234, 236.

In an exemplary embodiment, the antenna element 240 may be similar to the antenna element 210. The antenna element 240 includes a first receiving antenna 250 and a second receiving antenna 252. The antenna element 240 includes a ground plane 254. The first and second receiving antennas 250, 252 are arranged in a stacked configuration with the ground plane 254. The first and second receiving antennas 250, 252 are separated by dielectric, such as air or another dielectric material, such as ceramic. Optionally, the antenna element 240 may be a circuit board with the ground plane 254 and receiving antennas 250, 252 being defined by different layers of the circuit board.

The first transmission line 234 is communicatively coupled to the first receiving antenna 250. The second transmission line 236 is communicatively coupled to the second receiving antenna 252. In an exemplary embodiment, the first and second transmission lines 234, 236 are coaxial cables with the center conductors of such coaxial cables being terminated directly to the first and second receiving antennas 250, 252, such as by soldering the center conductors to the receiving antennas 250, 252.

The receiving antennas 250, 252 are configured to receive a particular type of signal. For example, the first receiving antenna 250 is able to receive the first signal but is not able to receive the second signal. The second receiving antenna 252 is able to receive the second signal but is not able to receive the first signal. The receiving antennas 250, 252 are designed to be excited by signals having a particular mode, and are thus able to separate out particular signals while being unaffected by other types of signals. The receiving antennas 250, 252 are non-responsive to certain signals, and thus operate as selective filters that isolate the communication channels 124, 126 from the undesired or opposite mode signals. The size and/or shape of the receiving antennas 250, 252 as well as the location of the feed point where the transmission lines 234, 236 are attached to the receiving antennas 250, 252 allow the receiving antennas 250, 252 to be excited by EM waves having a particular propagation mode. For example, the receiving antennas 250, 252 may be responsive to EM waves that are either right hand circularly polarized or left hand circularly polarized. The first receiving antenna 250 is responsive to EM waves that have different a polarization mode than those that excite the second receiving antenna 252.

Figure 6:
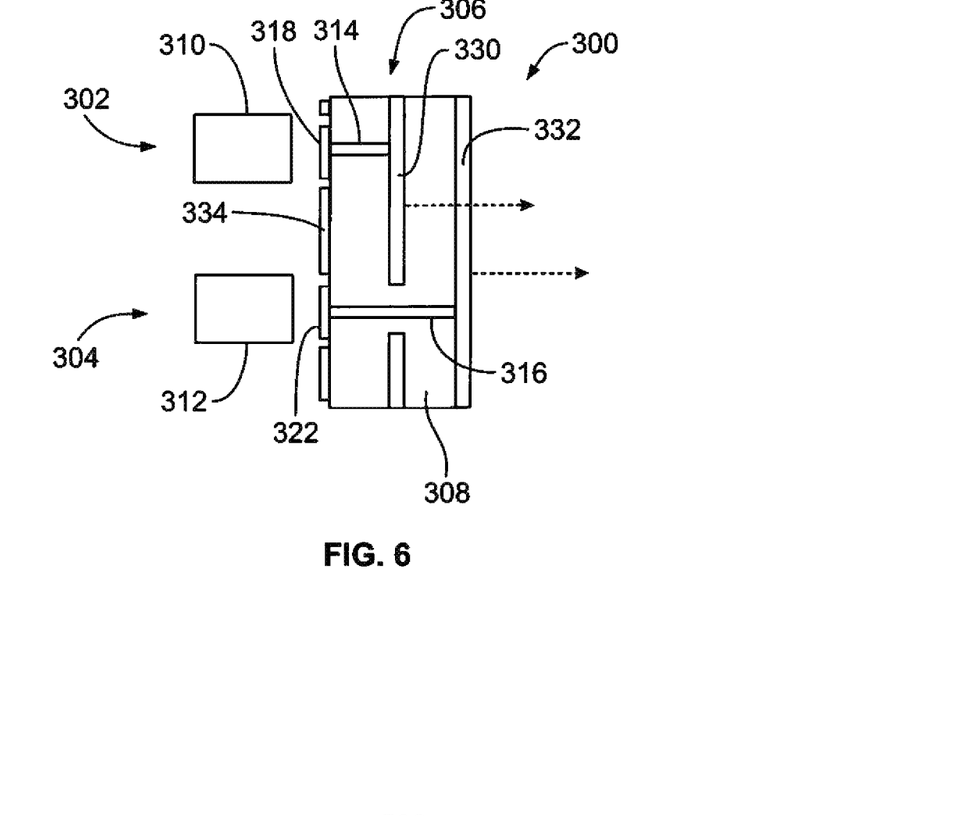
FIG. 6 illustrates a transmitter formed in accordance with an exemplary embodiment.

FIG. 6 illustrates a transmitter 300 formed in accordance with an exemplary embodiment. The transmitter 300 includes first and second communication channels 302, 304 conveying first and second signals to a corresponding receiver. The first and second signals may be EM waves that propagate away from the transmitter 300 toward the receiver. The first and second communication channels 302, 304 use distinct and separable polarization modes to provide isolation between the signals.

The transmitter 300 includes an antenna element 306 having a dielectric body 308. The antenna element 306 may be a circuit board. The transmitter 300 includes a first transmit integrated circuit 310 generating a first signal that is propagated by the antenna element 306, such as to a waveguide. The transmitter 300 includes a second transmit integrated circuit 312 generating a second signal that is propagated by the antenna element 306, such as to a waveguide. A shield could be provided between the integrated circuits 312, 310 to prevent crosstalk therebetween.

The antenna element 306 includes a first transmission line 314 communicatively coupled to the first transmit integrated circuit 310 and a second transmission line 316 communicatively coupled to the second transmit integrated circuit 312. In the illustrated embodiment, the first and second transmission lines 314, 316 are plated vias extending through the dielectric body 308. Other types of transmission lines may be used in alternative embodiments.

In an exemplary embodiment, the antenna element 306 includes a first pickup antenna 318 position adjacent the first transmit integrated circuit 310 that is connected to the first transmission line 314. A second pickup antenna 322 is positioned adjacent the second transmit integrated circuit 312 and is coupled to the second transmission line 316.

In an exemplary embodiment, the antenna element 306 includes a first propagation antenna 330 and a second propagation antenna 332. The antenna element 306 includes a ground plane 334. The propagation antennas 330, 334 and the ground plane 334 may be layers of a circuit board. The first and second propagation antennas 330, 332 are arranged in a stacked configuration with the ground plane 334. The first and second propagation antennas 330, 332 are separated by the dielectric body 308. Optionally, the ground plane 334 may be coplanar with the pickup antennas 318, 322 and includes openings around the pickup antennas 318, 322 to electrically isolate the pickup antennas 318, 322 from the ground plane 334.

In use, data streams are furnished to the first and second transmit integrated circuits 310, 312, which produce corresponding modulated signals, such as at 60 GHz. The first pickup antenna 318 receives the energy from the first transmit integrated circuit 310. The second pickup antenna 322 receives the energy from the second transmit integrated circuit 312. The first and second signals are propagated by the transmission lines 314, 316 to the propagation antennas 330, 332.

The size, and shape of the propagation antennas 330, 332 as well as the location of the feed point where the transmission lines 314, 316 are attached to the propagation antennas 330, 332 produce differently polarized EM waves that propagate away from the antennas 330, 332. The EM waves may be right hand circularly polarized or left hand circularly polarized. Using different polarization modes provides isolation between the first and second signals of the first and second communication channels 302, 304. The first propagation antenna 330 selectively emits EM waves having a particular polarization mode and the second propagation antenna 332 selectively emits EM waves having a different, distinct polarization mode.

Figure 7:
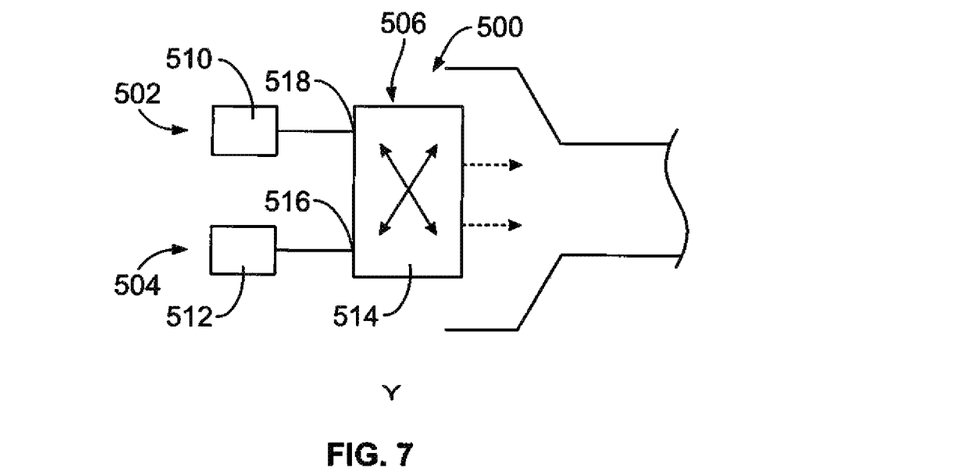
FIG. 7 illustrates a transmitter formed in accordance with an exemplary embodiment.

FIG. 7 illustrates a transmitter 500 formed in accordance with an exemplary embodiment. The transmitter 500 includes first and second communication channels 502, 504 conveying first and second signals to a corresponding receiver. The first and second signals may be EM waves that propagate away from the transmitter 500 toward the receiver. The first and second communication channels 502, 504 use distinct and separable polarization modes to provide isolation between the signals.

The transmitter 500 includes an antenna element 506. The transmitter 500 includes a first transmit integrated circuit 510 generating a first signal that is propagated by the antenna element 506, such as to a waveguide. The transmitter 500 includes a second transmit integrated circuit 512 generating a second signal that is propagated by the antenna element 506, such as to a waveguide.

The antenna element 506 includes an integrated 90° hybrid coupler 514. The antenna element 506 includes dual orthogonal feedpoints 516, 518. The antenna element 506 produces two different circularly polarized wavefronts with a single patch rather than a stacked patch. In an alternative embodiment, crossed fat dipoles are used for greater bandwidth. In other alternative embodiments, a sinuous antenna is used for greater bandwidth.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. Dimensions, types of materials, orientations of the various components, and the number and positions of the various components described herein are intended to define parameters of certain embodiments, and are by no means limiting and are merely exemplary embodiments. Many other embodiments and modifications within the spirit and scope of the claims will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means—plus-function format and are not intended to be interpreted based on 35 U.S.C. §112, sixth paragraph, unless and until such claim limitations expressly use the phrase "means for" followed by a statement of function void of further structure.

What is claimed is:

1. A contactless connector comprising:
   a transmitter comprising a first transmit integrated circuit generating a first radio frequency (RF) signal and a second transmit integrated circuit generating a second RF signal, the first RF signal being right hand circularly polarized and the second RF signal being left hand circularly polarized;
   a first pick-up antenna adjacent the first transmit integrated circuit and conveying the first RF signal along a first transmission line to a first propagation antenna; and
   a second pick-up antenna adjacent the second transmit integrated circuit and conveying the second RF signal along a second transmission line to a second propagation antenna;
   wherein the first and second propagation antennas transmit the first and second RF signals to a propagation path at different and separable polarizations to allow duplex communication with the propagation path.

2. The contactless connector of claim 1, wherein the first and second RF signals are propagated as axisymmetric modes.

3. The contactless connector of claim 1, further comprising an antenna element comprising a ground plane, the first propagation antenna and the second propagation antenna.

4. The contactless connector of claim 1, further comprising an antenna element comprising a dielectric substrate supporting and extending between the first propagation antenna and the second propagation antenna, at least one of the first and second transmission lines extending through the dielectric substrate.

5. The contactless connector of claim 1, further comprising a shield separating the first transmit integrated circuit and the second transmit integrated circuit.

6. A contactless connector comprising:
a transmitter comprising a transmit integrated circuit generating a signal, a pick-up antenna adjacent the transmit integrated circuit and conveying the signal along a transmission line to a propagation antenna, the propagation antenna re-transmitting the signal;
a propagation path receiving the signal emitted from the propagation antenna and conveying the signal from a first end to a second end of the propagation path; and
a receiver comprising a receiving antenna receiving the signal from the propagation path, a transmission line coupled to the receiving antenna and conveying the signal to a re-transmit antenna and a receive integrated circuit receiving the signal from the re-transmit antenna;
wherein the propagation path allows relative rotation between the propagation antenna and the receiving antenna.

7. The contactless connector of claim 6, wherein the propagation path is defined, at least in part, by a waveguide, the waveguide having a rotary joint allowing relative rotation between the first and second ends of the propagation path.

8. The contactless connector of claim 6, wherein the propagation antenna emits first signals and the transmitter is configured to emit second signals, the first signals being right hand circularly polarized and the second signals being left hand circularly polarized.

9. A contactless connector comprising:
a first module having a first communication channel communicating first signals and a second communication channel communicating second signals, the signals of the first communication channel being produced by a first polarization mode, the signals of the second communication channel being produced by a second polarization mode distinct and separable from the first polarization mode;
a second module having a first communication channel communicating the first signals with the first module and a second communication channel communicating the second signals with the first module; and
a propagation path conveying the first and second signals between a first end and a second end of the propagation path between the first and second modules, wherein the propagation path allows relative rotation between the first end and the second end.

10. The contactless connector of claim 9, wherein the propagation path conveys the first and second signals in the same space and on the same frequency, the first and second signals having separable polarizations such that the first and second signals are capable of being recovered.

11. The contactless connector of claim 9, wherein the first module is located within a first housing and the second module is located within a second housing, the propagation path being positioned between the first and second housings, the propagation path accommodating relative rotation between the first and second housings.

12. The contactless connector of claim 9, wherein the propagation path is defined, at least in part, by a waveguide, the waveguide having a rotary joint allowing relative rotation between the first and second ends of the propagation path.

13. The contactless connector of claim 9, wherein the first communication channel of the first module is one of a transmit channel or a receive channel and the first communication channel of the second module is the other of a transmit channel or a receive channel, and wherein the second communication channel of the first module is one of a transmit channel or a receive channel and the second communication channel of the second module is the other of a transmit channel or a receive channel.

14. The contactless connector of claim 9, wherein the first and second communication channels of the first module are transmit channels and wherein the first and second communication channels of the second module are receive channels.

15. The contactless connector of claim 9, wherein the first communication channel of the first module includes an antenna emitting the first signal, the second communication channel of the first module includes an antenna emitting the second signal, the first communication channel of the second module including an antenna excited by the first signal and not the second signal, the second communication channel of the second module including an antenna excited by the second signal and not by the first signal.

16. The contactless connector of claim 9, wherein the first polarization mode and the second polarization mode are axisymmetric.

17. The contactless connector of claim 9, wherein the first communication channel of the first module includes a first transmit integrated circuit generating the first signal and a first pickup antenna adjacent the first transmit integrated circuit and conveying the first signal along a first transmission line to a first propagation antenna, and wherein the second communication channel of the first module includes a second transmit integrated circuit generating the second signal and a second pickup antenna adjacent the second transmit integrated circuit and conveying the second signal along a second transmission line to a second propagation antenna.

18. The contactless connector of claim 9, wherein the first signals are right hand circularly polarized and the second signals are left hand circularly polarized.

19. A contactless connector comprising:
a transmitter sending RF data transmissions in different propagation modes;
a propagation path receiving the RF data transmissions and conveying the RF data transmissions from a first end to a second end of the propagation path, the first end receiving the RF data transmissions from the transmitter, wherein the propagation path includes a rotary joint allowing relative rotation between the first end and the second end; and
a receiver receiving the RF data transmissions from the propagation path, the receiver capable of recovering the RF data transmissions of the different propagation modes.

20. The contactless connector of claim 19, wherein the transmitter sends the RF data transmissions in axisymmetric modes.

21. The contactless connector of claim 19, wherein the transmitter includes a first propagation antenna to emit first signals defining RF data transmissions and the transmitter includes a second propagation antenna to emit second signals defining RF data transmissions, the receiver includes a first receiving antenna excited by the first signals and not the second signals and the receiver includes a second receiving antenna excited by the second signals and not the first signals.

22. The contactless connector of claim 19, wherein the transmitter includes a first communication channel and a second communication channel, the first communication channel includes a first transmit integrated circuit generating RF data transmissions and a first pickup antenna adjacent the first transmit integrated circuit and conveying corresponding RF data transmissions along a first transmission line to a first propagation antenna, and wherein the second communication channel includes a second transmit integrated circuit generating the RF data transmissions and a second pickup antenna adjacent the second transmit integrated circuit and conveying corresponding RF data transmissions along a second transmission line to a second propagation antenna.

23. The contactless connector of claim 19, wherein the transmitter includes a first propagation antenna to emit first signals defining RF data transmissions and the transmitter includes a second propagation antenna to emit second signals defining RF data transmissions, the first signals being right hand circularly polarized and the second signals being left hand circularly polarized.

* * * * *